(12) United States Patent
Carter, Jr. et al.

(10) Patent No.: US 12,404,018 B2
(45) Date of Patent: Sep. 2, 2025

(54) MAST DAMPENER FOR A ROTORCRAFT

(71) Applicant: Jaunt Air Mobility, LLC, Glasboro, NJ (US)

(72) Inventors: Jay W. Carter, Jr., Wichita Falls, TX (US); Jeffrey R. Lewis, Wichita Falls, TX (US); M. Keith Robinson, Wichita Falls, TX (US)

(73) Assignee: Jaunt Air Mobility, Dallas, TX (US)

( * ) Notice: Subject to any disclaimer, the term of this patent is extended or adjusted under 35 U.S.C. 154(b) by 282 days.

(21) Appl. No.: 17/943,732

(22) Filed: Sep. 13, 2022

(65) Prior Publication Data

US 2023/0192284 A1 Jun. 22, 2023

Related U.S. Application Data

(63) Continuation-in-part of application No. 16/682,778, filed on Nov. 13, 2019, now abandoned, which is a
(Continued)

(51) Int. Cl.
*B64C 27/72* (2006.01)
*B64C 27/02* (2006.01)
(Continued)

(52) U.S. Cl.
CPC ............ *B64C 27/72* (2013.01); *B64C 27/025* (2013.01); *B64C 27/26* (2013.01); *B64C 27/33* (2013.01); *B64C 27/57* (2013.01); *B64C 27/59* (2013.01); *B64C 27/82* (2013.01); *B64C 2027/7216* (2013.01); *B64C 2027/8236* (2013.01);
(Continued)

(58) Field of Classification Search
CPC ....... B64C 27/72; B64C 27/025; B64C 27/26; B64C 27/33; B64C 27/57; B64C 27/59; B64C 27/82; B64C 27/028; B64C 27/001; B64C 2027/7216; B64C 2027/8236;
(Continued)

(56) References Cited

U.S. PATENT DOCUMENTS

| | | |
|---|---|---|
| 2,439,089 A | 4/1948 | Hodson |
| 2,665,859 A | 1/1954 | Papadakos |

(Continued)

FOREIGN PATENT DOCUMENTS

| | | |
|---|---|---|
| GB | 673421 | 6/1952 |
| GB | 2362627 | 11/2001 |

(Continued)

*Primary Examiner* — Russell Frejd
(74) *Attorney, Agent, or Firm* — Stradley Ronon Stevens & Young, LLP (57) ABSTRACT

A system to prevent or limit resonance in a rotocraft. The system comprises an airframe, a rotor system having a natural frequency and including a rotor and a mast attached to the airframe, and a non-linear spring positioned between the rotor system and the airframe. The rotor system and the airframe are operable to move relative to each other as the rotor system begins to oscillate. The non-linear spring is configured to be deformed when the rotor system and the airframe move relative to each other such that the deformation of the non-linear spring causes the natural frequency of the rotor system to change. Also disclosed is a related method for preventing or limiting resonance in a rotorcraft.

20 Claims, 5 Drawing Sheets

Related U.S. Application Data continuation of application No. 14/645,348, filed on Mar. 11, 2015, now abandoned.

(60) Provisional application No. 61/951,035, filed on Mar. 11, 2014, provisional application No. 61/951,083, filed on Mar. 11, 2014.

(51) Int. Cl.
*B64C 27/26* (2006.01)
*B64C 27/33* (2006.01)
*B64C 27/57* (2006.01)
*B64C 27/59* (2006.01)
*B64C 27/82* (2006.01)

(52) U.S. Cl.
CPC ............. *B64C 2027/8272* (2013.01); *B64C 2027/8281* (2013.01); *Y02T 50/30* (2013.01)

(58) Field of Classification Search
CPC .... B64C 2027/8272; B64C 2027/8281; B64C 2027/002; Y02T 50/30
See application file for complete search history.

(56) References Cited

U.S. PATENT DOCUMENTS

| | | | |
|---|---|---|---|
| 2,940,693 A | 6/1960 | Hislop | |
| 3,360,050 A | 12/1967 | Sibley | |
| 3,385,537 A | 5/1968 | Lichten | |
| 3,697,024 A * | 10/1972 | Kosziech | B64C 27/001 248/596 |
| 4,071,811 A | 1/1978 | Irwin | |
| D381,952 S | 8/1997 | Carter | |
| 5,727,754 A | 3/1998 | Carter | |
| 5,853,145 A | 12/1998 | Carter | |
| 5,865,399 A | 2/1999 | Carter | |
| 5,868,355 A | 2/1999 | Carter | |
| 5,944,283 A | 8/1999 | Carter | |
| 5,997,250 A | 12/1999 | Carter et al. | |
| 6,024,325 A | 2/2000 | Carter | |
| 6,077,041 A | 6/2000 | Carter | |
| 6,155,784 A | 12/2000 | Carter | |
| 6,405,980 B1 | 6/2002 | Carter | |
| 6,435,453 B1 | 8/2002 | Carter | |
| 6,474,598 B2 | 11/2002 | Carter | |
| 6,513,752 B2 | 2/2003 | Carter | |
| 6,524,068 B2 | 2/2003 | Carter | |
| 6,527,515 B2 | 3/2003 | Carter | |
| 6,986,642 B2 | 1/2006 | Carter | |
| 7,137,591 B2 | 11/2006 | Carter et al. | |
| 7,153,094 B2 * | 12/2006 | Sehgal | B64C 27/001 416/500 |
| 7,448,571 B1 | 11/2008 | Carter et al. | |
| 7,490,792 B1 | 2/2009 | Carter | |
| 7,510,377 B1 | 3/2009 | Carter et al. | |
| 7,677,492 B1 | 3/2010 | Carter et al. | |
| 8,376,266 B2 | 2/2013 | Gemmati | |
| 8,739,679 B2 | 6/2014 | Carter | |
| 8,979,015 B2 | 3/2015 | Gaillard | |
| 8,991,744 B1 * | 3/2015 | Khan | G05D 19/00 244/17.11 |
| 8,991,745 B1 * | 3/2015 | Khan | B64C 27/52 244/17.11 |
| 9,611,036 B1 * | 4/2017 | Khan | G05D 19/00 |
| 10,101,719 B1 | 10/2018 | Kroo | |
| 10,144,510 B1 | 12/2018 | Vander Lind | |
| 10,676,188 B2 | 6/2020 | Campbell | |
| 10,836,482 B2 | 11/2020 | Gaffiero | |
| 2002/0011539 A1 | 1/2002 | Carter | |
| 2003/0094537 A1 | 5/2003 | Austen-Brown | |
| 2007/0170307 A1 | 7/2007 | De La Cierva Hoces | |
| 2009/0159740 A1 | 6/2009 | Brody | |
| 2010/0023054 A1 | 1/2010 | Matsutani et al. | |
| 2010/0065677 A1 | 3/2010 | Ferrier | |
| 2010/0327123 A1 | 12/2010 | Smith | |
| 2012/0153072 A1 | 6/2012 | Eglin | |
| 2012/0168556 A1 | 7/2012 | Sonneborn | |
| 2012/0280091 A1 | 11/2012 | Saiz | |
| 2012/0325340 A1 | 12/2012 | Carter et al. | |
| 2013/0134253 A1 | 5/2013 | Carter | |
| 2013/0134264 A1 | 5/2013 | Carter et al. | |
| 2014/0061367 A1 | 3/2014 | Fink | |
| 2014/0084106 A1 | 3/2014 | Eglin | |
| 2014/0353420 A1 | 12/2014 | Prud Homme-Lacroix | |
| 2015/0225074 A1 | 8/2015 | Carter et al. | |
| 2016/0200436 A1 | 7/2016 | North | |
| 2016/0207625 A1 | 7/2016 | Judas | |
| 2016/0257399 A1 | 9/2016 | Carter et al. | |
| 2018/0057158 A1 | 3/2018 | Vialle | |
| 2018/0077350 A1 | 3/2018 | Grenier | |
| 2018/0305005 A1 | 10/2018 | Parks | |
| 2018/0312251 A1 | 11/2018 | Petrov | |
| 2019/0329881 A1 | 10/2019 | Gaffiero | |
| 2019/0337614 A1 | 11/2019 | Villa | |
| 2020/0062386 A1 | 2/2020 | Zhang | |
| 2020/0102073 A1 | 4/2020 | Carter et al. | |
| 2020/0156778 A1 | 5/2020 | Mcdonald | |
| 2020/0180755 A1 | 6/2020 | Prud'Homme Lacroix | |
| 2020/0217658 A1 | 7/2020 | Abdelli | |
| 2020/0223540 A1 | 7/2020 | Ivans | |
| 2020/0269975 A1 | 8/2020 | Fink | |
| 2020/0309066 A1 | 10/2020 | Ross | |
| 2021/0047028 A1 | 2/2021 | Choi | |

FOREIGN PATENT DOCUMENTS

| | | |
|---|---|---|
| GB | 2362865 | 12/2001 |
| WO | 199708050 | 3/1997 |
| WO | 20120178181 | 12/2012 |
| WO | 2013155402 | 10/2013 |

* cited by examiner

MAST DAMPENER FOR A ROTORCRAFT

CROSS-REFERENCE TO RELATED APPLICATIONS

This application is a continuation-in-part of U.S. patent application Ser. No. 16/682,778 filed on Nov. 13, 2019, which is a continuation of U.S. patent application Ser. No. 14/645,348 filed on Mar. 11, 2015, now abandoned, which claims priority to U.S. Provisional Patent Application No. 61/951,035 filed on Mar. 11, 2014, U.S. Provisional Patent Application No. 61/951,064 filed on Mar. 11, 2014, U.S. Provisional Patent Application No. 61/951,083 filed on Mar. 11, 2014, and U.S. Provisional Patent Application No. 61/951,118 filed on Mar. 11, 2014, all of which are incorporated herein by reference in their entirety.

TECHNICAL FIELD

This disclosure relates to rotor aircrafts in general and, more particularly, to vibration on a rotorcraft.

BACKGROUND

Rotorcrafts consist of an airframe attached to a rotor and include, for example, helicopters, gyrocopters and compound and slowed-rotor compound aircrafts such as gyroplanes and heliplanes. The rotor is essentially a large rotating mass that includes two or more rotor blades. Rotorcrafts can generally take-off and land vertically and the rotor, during at least a portion of the flight, provides all or substantially all of the lift.

In some instances, the rotor, being a large rotating mass, is prone to creating resonance. Resonance may be described as the tendency of a system to oscillate with greater amplitude when some driving force closely matches the natural frequency of the system. In some instances, the resonance can cause the amplitude of oscillation to become so great that the system fails catastrophically. Current methods to address resonance on rotorcraft typically include damping vibration isolators.

Two of the most common ways of controlling vibration are vibration isolation and vibration damping. Although the terms are often used interchangeably, they identify two very different processes. Vibration isolation prevents vibration transmission by preventing vibration energy from entering an object, such as a structure or piece of equipment. Vibration damping dissipates vibration energy. It absorbs or changes vibration energy, reducing the amount of energy transmitted through the equipment or structure. Understanding these processes—and when to use them—also requires understanding two concepts: transmissibility and natural frequency.

Transmissibility is the ratio of the vibrational force being measured in a system to the vibrational force entering a system. For example, if a material used for vibration isolation has a transmissibility of 75%, that means 75% of the vibrating force energy is being transmitted (or 25% transmission loss) through the materials and measured on the other side. Natural frequency is the frequency (number of cyclic motions per unit time) at which an object or structure vibrates naturally or resonates. A structure vibrating at natural frequency will vibrate forever unless an outside force interferes with it. Thankfully, in nature, there is always some force affecting a vibrating object, removing energy and eventually dissipating the vibration; these forces collectively are commonly referred to as vibration damping.

A need remains for a system and method that would address resonance on a rotorcraft using vibration damping. An object of such a system and method would be to minimize if not eliminate the risk of an increase in the amplitude of vibration on the rotorcraft. Related objects would be to minimize the likelihood of a catastrophic amplitude of vibration during flight and to improve the safety of rotorcrafts.

SUMMARY

To meet this and other needs, to achieve these and other objects, and in view of its purposes, the present disclosure provides a system to prevent or limit resonance in a rotorcraft. The system comprises an airframe, a rotor system having a natural frequency and including a rotor and a mast attached to the airframe, and a non-linear spring positioned between the rotor system and the airframe. The rotor system and the airframe are operable to move slightly relative to each other as the rotor system begins to oscillate. The non-linear spring is configured to be deformed when the rotor system and the airframe move relative to each other such that the deformation of the non-linear spring causes the natural frequency of the rotor system to change.

A related method is also disclosed that prevents or limits resonance in a rotorcraft. The method comprises the following steps. First, a rotorcraft is provided including an airframe, a rotor system having a natural frequency and a rotor and a mast, and an attachment mechanism positioned between the airframe and the rotor system. The rotor system and the airframe are operable to move slightly relative to each other as the rotor system begins to oscillate. Next, the rotor system and the airframe are caused to move relative to each other. Finally, the attachment mechanism is activated to change the natural frequency of the rotor system.

It is to be understood that both the foregoing general description and the following detailed description are exemplary, but are not restrictive, of the disclosure.

DESCRIPTION OF THE FIGURES

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

This description relates in general to rotor aircraft, in particular to the attachment of the rotor system, which includes the mast and the rotor, to the fuselage, and specifically a non-linear spring to reduce resonance. The subject of this description is a mast-fuselage attachment mechanism that uses a non-linear spring to reduce resonance in the rotorcraft.

In a linear system, natural frequency can be determined by modeling the system as a simple harmonic oscillator. In such a system, the natural frequency can be determined with the following equation: $\omega_o = \sqrt{(k/m)}$. In this equation, $\omega_o$ is the natural frequency, k is the spring rate, and m is the mass of the system. Note that the natural frequency is independent of the amplitude of the oscillation. If a driving frequency matches the natural frequency, this will lead to a resonance. In an underdamped system, the amplitude of vibration can increase until the amplitude of vibration becomes catastrophic.

A system with a non-linear spring behaves differently. The amplitude of the oscillation does affect the resonant frequency. This frequency shift is defined by the formula: $\omega = \omega_o + \kappa A^2$. In this equation, $\omega_o$ is the base natural frequency, $\kappa$ is a constant, and A is the amplitude of the oscillation. So, even in the event that a driving frequency caused the system to oscillate, an increased amplitude would change the natural frequency of the system so that the natural frequency no longer matched the driving frequency, self-limiting the maximum amplitude. The non-linear spring may act as a damper by limiting the resonance in the rotor system or by preventing resonance from staying in the rotor system because the driving frequency causes the natural frequency to dynamically change so that the two frequencies do not match.

Figure 1:
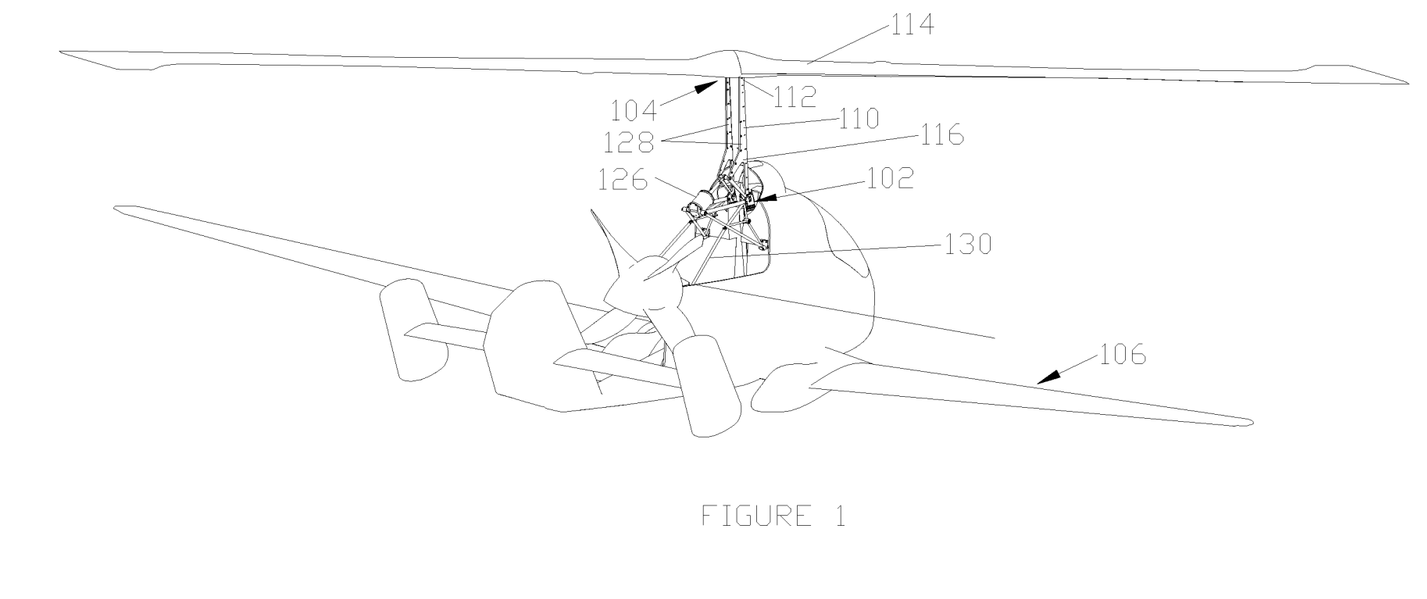
FIG. 1 is a perspective view of a gyroplane constructed in accordance with this description with a portion cut-away.
Figure 2:
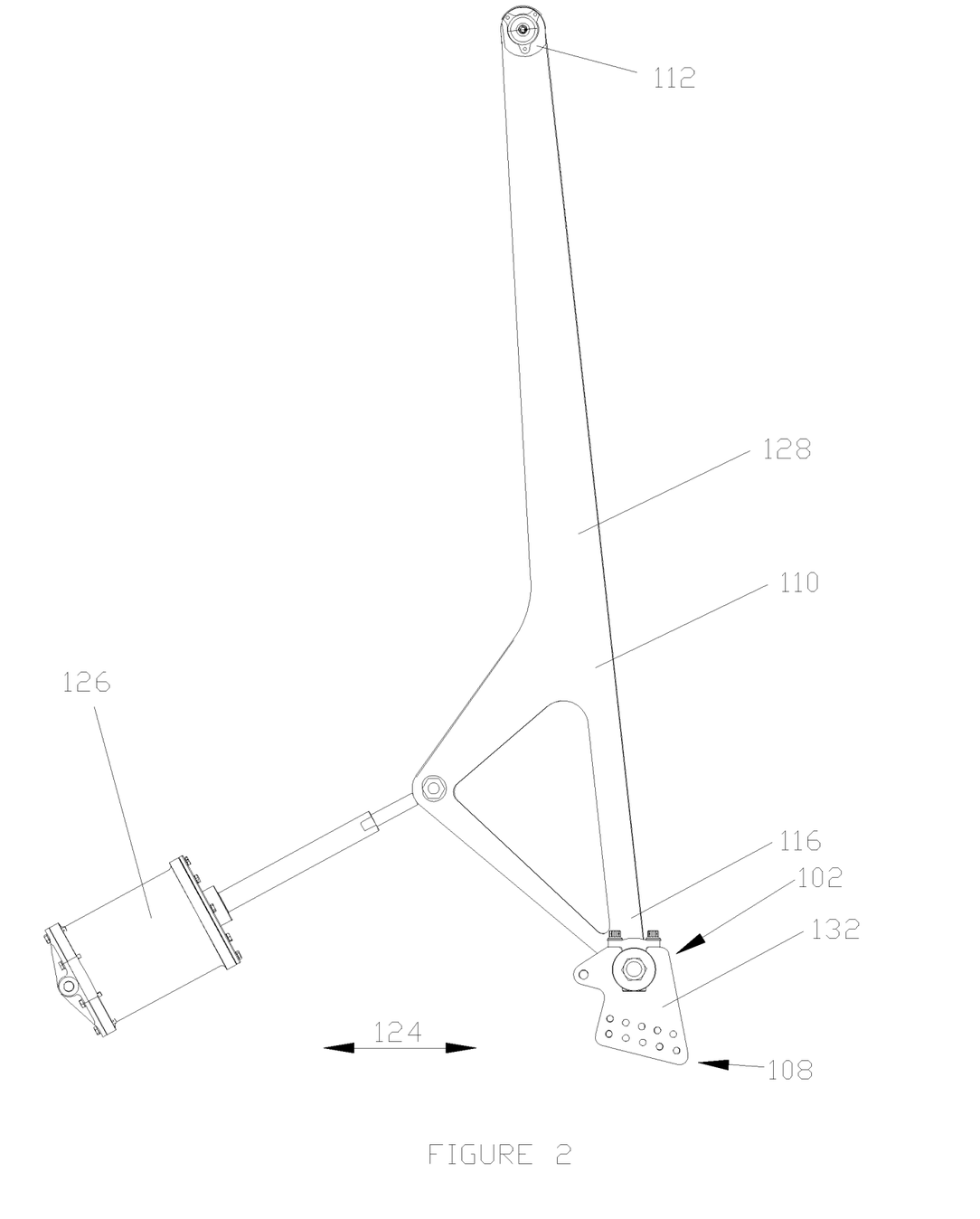
FIG. 2 is a side view of a mast-airframe connection assembly.

Referring now to the drawing, in which like reference numbers refer to like elements throughout the various figures that comprise the drawing, FIGS. 1-5 illustrate a non-limiting embodiment of an attachment mechanism 102 for changing the natural frequency of a rotor system 104 implemented in a rotorcraft 106. The rotorcraft 106 illustrated in FIG. 1 is a gyroplane having a tilting mast, and, more specifically, is a slowed-rotor compound aircraft similar to the aircraft described in U.S. Pat. No. 7,137,597, incorporated herein by reference. It will be appreciated, however, by one of ordinary skill in the art that the rotorcraft 106 may be any known rotorcraft, including helicopters, gyroplanes, compound helicopters, or compound gyroplanes.

The rotorcraft 106 comprises an airframe or fuselage 108 attached to the rotor system 104 via the attachment mechanism 102. The rotor system includes a mast 110 that is attached at a first end or top 112 to a rotor 114. The mast 110, at a second end or bottom 116, is attached to the fuselage 108. The attachment mechanism 102 includes non-linear springs 118 operable to change the natural frequency of the rotor system 104 to prohibit any oscillation occurring in the rotor system 104 from amplifying to catastrophic levels.

In one non-limiting embodiment, the non-linear springs 118 are elastomeric elements 120. One skilled in the art will appreciate that other elements and configurations may be used that will function as a non-linear spring 118. For example, a properly tailored set of springs in series, such as a Belleville washer stack-up, could be made to increase the spring force if lighter springs bottomed out and only heavier springs were able to deflect.

The non-linear springs 118 may take numerous shapes so long as the shape functions as a non-linear spring under compression, i.e., the spring rate changes as the non-linear springs 118 are compressed or deformed. For example, if the mast 110 begins to oscillate, the mast 110 will compress the non-linear springs 118 in a manner such that the spring rate of the non-linear springs 118 changes, creating a non-linear spring reaction. In one embodiment, the rounded shape of the non-linear springs 118 allows the non-linear springs 118 to deform under compression in such a way that the spring rate of the non-linear springs 118 changes when the non-linear springs 118 are compressed.

Changing the spring rate will offset the natural frequency of the rotor system 104, keeping the oscillation from amplifying. In other words, by dynamically changing the natural frequency of the rotor system 104, the driving frequency is prevented from matching the natural frequency of the rotor system 104. The oscillation may occur in various directions. In the embodiment shown, however, it should be noted that the oscillation of concern will typically be limited to a side-to-side oscillating direction as shown by reference arrows 122, rather than in a fore/aft oscillating direction, as shown by reference arrows 124, because of a pneumatic mast actuation cylinder 126 illustrated in FIGS. 1 and 2 that is specific to this embodiment. It will be appreciated by one skilled in the art that the non-linear springs 118 may be used regardless of the direction of oscillation. The pneumatic mast actuation cylinder 126 is similar to the pneumatic mast actuation cylinder described in U.S. Pat. No. 7,137,597, preventing a resonance oscillation of the mast 110 in the fore/aft direction 124.

Referring still to FIGS. 1-5, the mast 110 consists of two side plates 128 and a non-structural fairing (not shown). The rotor 114 is attached to the top 112 of the mast 110. As illustrated in this non-limiting embodiment, the mast actuation cylinder 126 controls the fore/aft position of the mast 110 and restrains motion in the fore/aft direction 124. The mast 110 is attached to an airframe 130 through two attachment fittings 132. The two attachment fittings 132 carry substantially all of the weight of the airframe 130 when the rotor 114 is providing substantially all of the lift of the rotorcraft 106.

Figure 3:
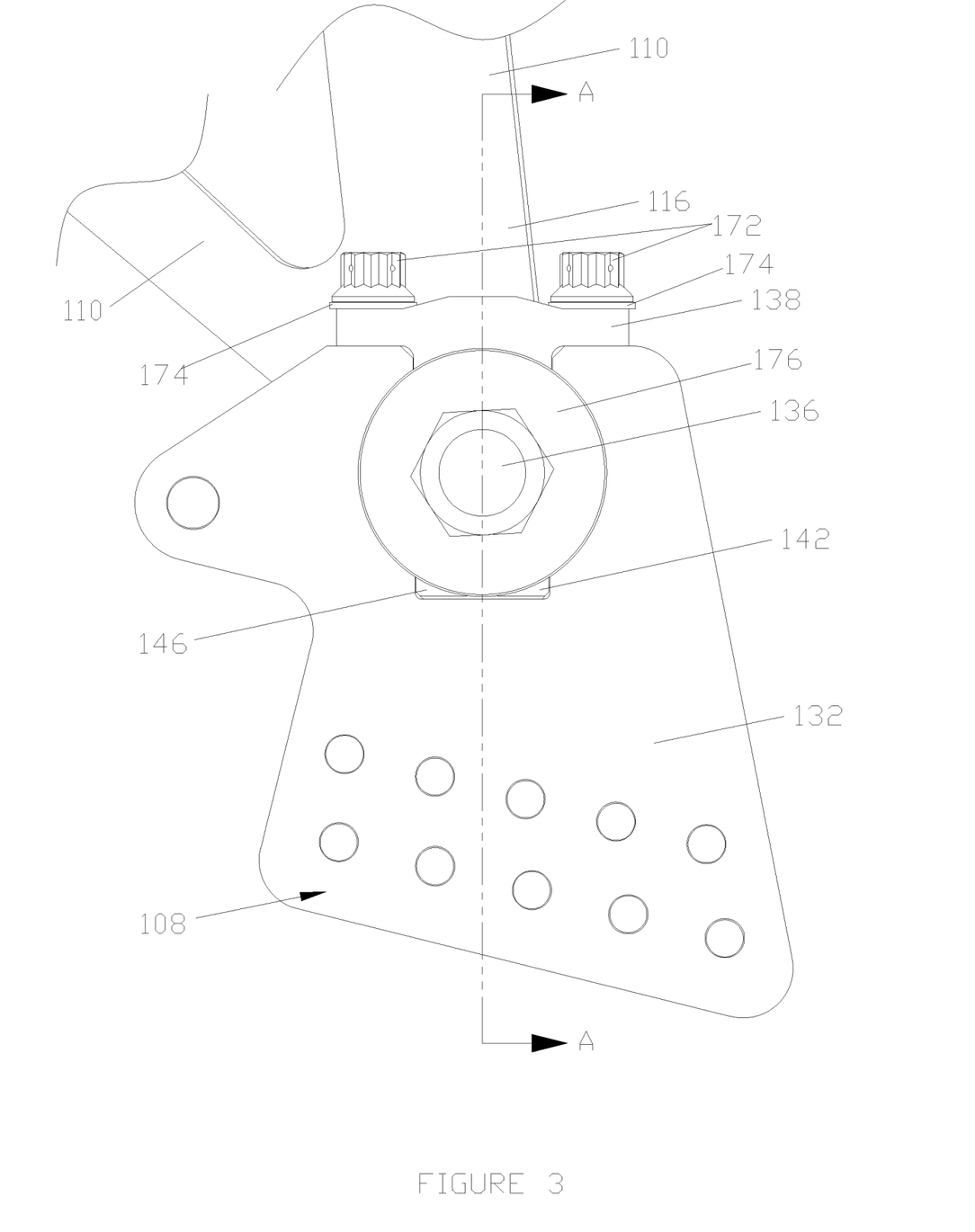
FIG. 3 is a detailed, side view of a mast-airframe connection assembly.
Figure 4:
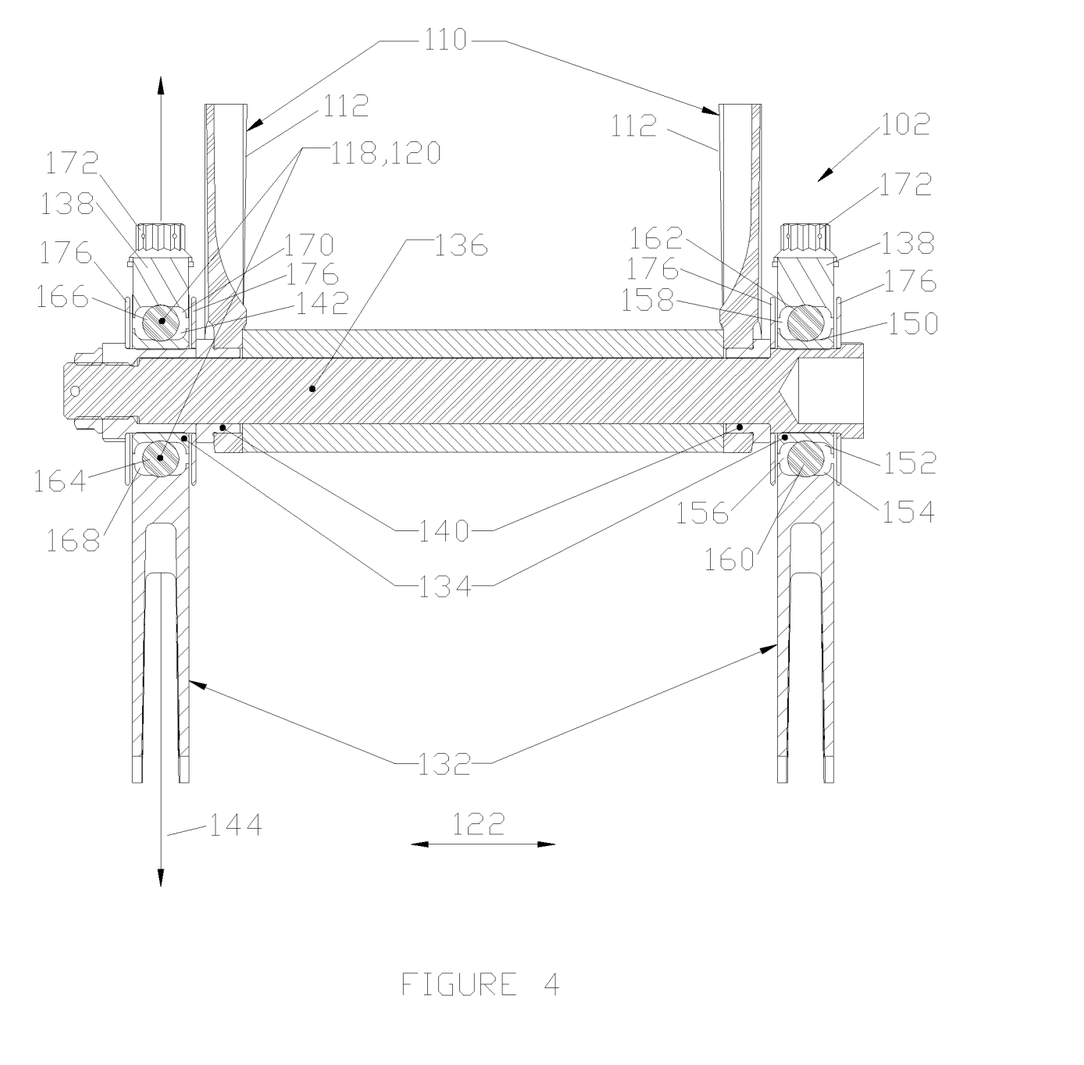
FIG. 4 is a cross-sectional view taken along the line A-A of FIG. 3.
Figure 5:
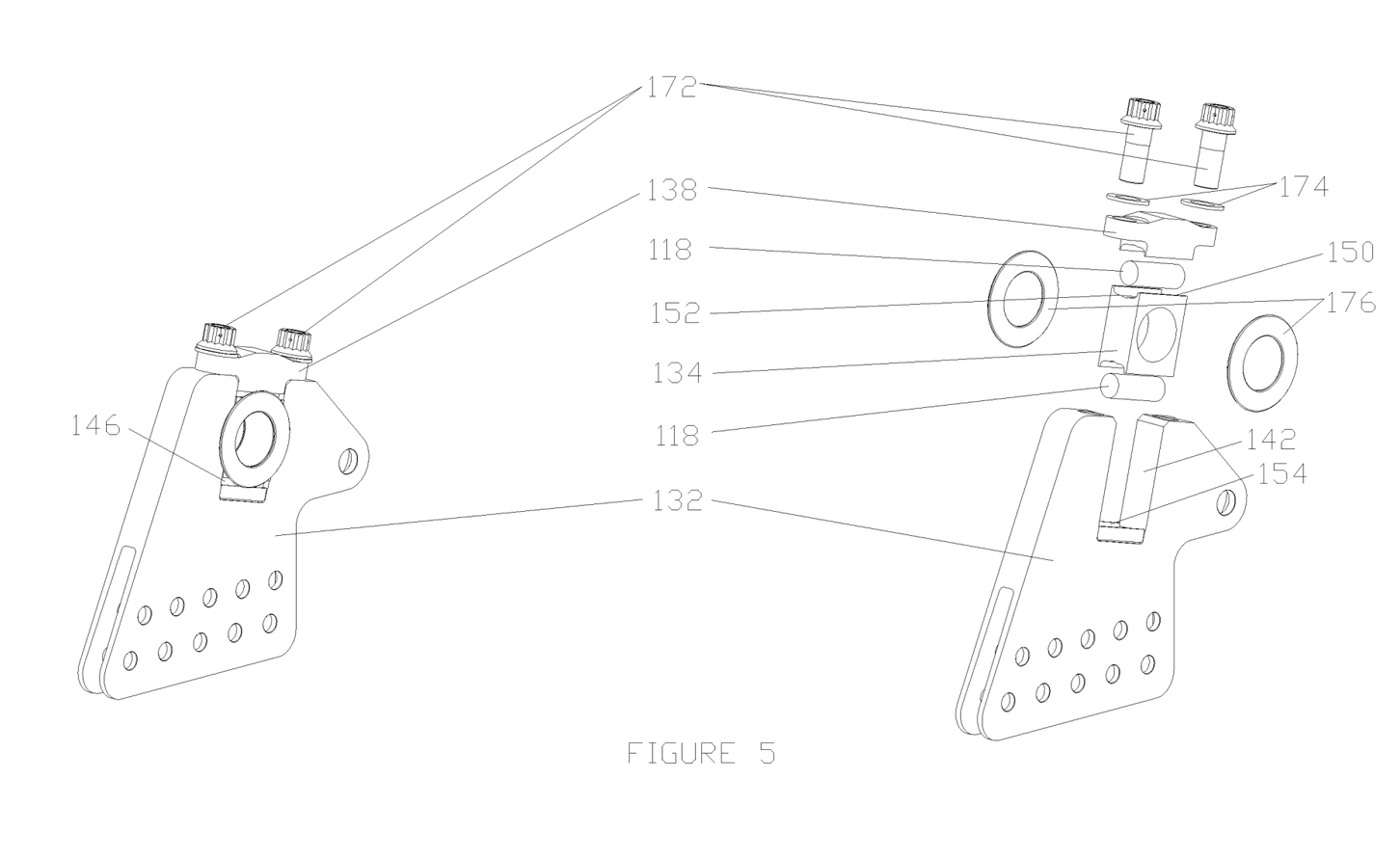
FIG. 5 is an exploded view of a mast-airframe connection assembly.

Referring to FIGS. 3, 4, and 5, the attachment mechanism 102 may include shuttles 134, a pin 136, endcaps 138, and bushings 140. The mast 110 is rotatably connected to the pin 136 via the bushings 140. The shuttles 134 are positioned adjacent the mast 110 with the pin 136 installed in each shuttle 134. The shuttles 134 are positioned in a slot 142 formed in the attachment fittings 132 and are operable to move along a longitudinal axis 144 within the slot 142. The endcaps 138 are attached to the attachment fittings 132 with bolts 172 and washers 174 forming a housing 146 that limits the travel of the shuttles 134. The non-linear springs 118 are positioned in the housing 146, and the non-linear springs 118 function to restrain or cushion the movement of the mast 110 relative to the fuselage 108. Side washers 176 restrain the shuttles 134 laterally.

In specific operation of the above embodiment, the elastomeric elements 120 are the non-linear springs 118 used in connecting the rotor system 104 to the fuselage 108. The shape of the elastomeric elements 120 may allow the elastomeric elements 120 to react with a non-linear force versus deflection. Ignoring deformation of the mast 110 itself, a side-to-side deflection of the mast 110 must be accompanied by compression of the elastomeric elements 120. Because of the non-linear response of the elastomeric elements 120, no particular rotor 114 rpm will be able to cause a large resonance. Even if a resonance begins, the deflection of the elastomeric elements 120 will change the spring rate of the rotor system 104, and the resonance will not be able to build any higher.

In addition, by using a mast actuation (pneumatic) cylinder 126 of sufficient volume, the fore/aft spring rate of the mast actuation cylinder 126 is such that the fore/aft natural frequency of the mast 110 is less than a minimum operation rotor rpm, thereby avoiding a resonance oscillation of the mast 110 in the fore/aft direction 124.

In one aspect, a system to prevent or limit resonance in a rotocraft 106 is described. The rotocraft 106 includes the rotor system 104 and the airframe 130. The rotor system 104 and the airframe 130 are operable to move relative to each other as the rotor system 104 begins to oscillate. Such movement in the joint between the rotor system 104 and the airframe 130 is typically slight. A non-linear spring 118 is positioned between the rotor system 104 and the airframe 130. The non-linear spring 118 is configured to be deformed when the rotor system 104 and the airframe 130 move relative to each other, such that the deformation of the non-linear spring 118 causes the natural frequency of the rotor system 104 to change. In this embodiment, the rotor system 104 includes the mast 110 and the rotor 114.

In another aspect, the attachment mechanism 102 connects the airframe 130 and the rotor system 104. The rotor system 104 includes the rotor 114 and the mast 110. The attachment mechanism 102 is operable to prevent or limit resonance in the rotocraft 106. In this embodiment, the attachment mechanism 102 includes the shuttle 134 having a first end 150 and a second, opposing end 152 configured to be connected to the mast 110. The airframe 130 includes the attachment fitting 132 with the slot 142 formed therein for receiving the shuttle 134 such that the shuttle 134 is operable to move generally along the longitudinal axis 144 of the slot 142. The endcap 138 is configured to be fitted adjacent to the second end 152 of the shuttle 134 and be attached to the attachment fitting 132. The non-linear spring 118 is positioned adjacent to the shuttle 134 and is operable to deform as the shuttle 134 and the mast 110 move relative to the attachment fitting 132 of the airframe 130.

In yet another aspect, the attachment mechanism 102 connects the airframe 130 and the rotor system 104. The rotor system 104 includes the rotor 114 and the mast 110. The attachment mechanism 102 prevents or limits resonance in the rotocraft 106. The attachment mechanism 102 includes the shuttle 134 having the first end 150 and the second, opposing end 152 and is configured to be connected to the mast 110. The airframe 130 has the attachment fitting 132 with the slot 142 formed therein for receiving the shuttle 134 such that the shuttle 134 is operable to move generally along the longitudinal axis 144 of the slot 142. The slot 142 includes a ledge 154 such that the ledge 154 and the first end 150 of the shuttle 134 are operable to form a first aperture 156 when the ledge 154 and the first end 150 of the shuttle 134 are positioned adjacent each other. The attachment mechanism 102 further includes the endcap 138 configured to be fitted adjacent to the second end 152 of the shuttle 134 and attached to the attachment fitting 132 such that the end cap 138 and the second end 152 of the shuttle 134 are operable to form a second aperture 158. A first non-linear spring 160 is configured to be positioned in the first aperture 156, and a second non-linear spring 162 configured to be positioned in the second aperture 158. The first and second non-linear springs 160, 162 are operable to deform as the shuttle 134 and the mast 110 move relative to the attachment fitting 132 of the airframe 130.

It should be appreciated that there may be two end caps 138, two shuttles 134, etc. and that a third and fourth non-linear spring 164, 166 and respective apertures 168, 170 may be deployed.

In one aspect of operation, a method for preventing or limiting resonance in the rotocraft 106 may include the following steps: introducing oscillation into the mast 110 attached to the fuselage 108 moveable relative to each other with the non-linear spring 118 positioned between the mast 110 and the fuselage 108; the oscillation causing movement of the mast 110 relative to the fuselage 108 and compression of the non-linear spring 118; and the compression of the non-linear spring 118 causing the natural frequency associated with the mast 110 to change.

In another aspect of operation, a method for preventing or limiting resonance in the rotorcraft 106 having the rotor system 104 and the fuselage 108 may include the following steps: positioning the non-linear spring 118 between the rotor system 104 and the fuselage 108, the rotor system 104 and the fuselage 108 operable to move relative to each other; causing the rotor system 104 and the fuselage 108 to move relative to each other; and deforming the non-linear spring 118 in response to the rotor system 104 and the fuselage 108 moving relative to each other, causing a natural frequency of the rotor system 104 to change.

Although the invention has been shown in only one of its forms, it should be apparent to those skilled in the art that it is not so limited but susceptible to various changes without departing from the scope of the invention.

In the foregoing description of certain embodiments, specific terminology has been resorted to for the sake of clarity. The disclosure is not intended to be limited to the specific terms so selected, however, and it is to be understood that each specific term includes other technical equivalents which operate in a similar manner to accomplish a similar technical purpose. Terms such as "left" and "right," "front" and "rear," "above" and "below," and the like are used as words of convenience to provide reference points and are not to be construed as limiting terms.

In this specification, the word "comprising" is to be understood in its "open" sense, that is, in the sense of "including" or "having," and thus not limited to its "closed" sense, that is the sense of "consisting only of." A corresponding meaning is to be attributed to the corresponding words "comprise," "comprised," and "comprises" where they appear.

In addition, the foregoing describes only some embodiments of the disclosure, and alterations, modifications, additions, and/or changes can be made thereto without departing from the scope and spirit of the disclosed embodiments, the embodiments being illustrative and not restrictive.

Furthermore, the systems and methods have been described in connection with what are presently considered to be the most practical and preferred embodiments. It is to be understood, however, that the systems and methods are not to be limited to the disclosed embodiments; on the contrary, they are intended to cover various modifications and equivalent arrangements included within the spirit and scope of the systems and methods. Also, the various embodiments described above may be implemented in conjunction with other embodiments, e.g., aspects of one embodiment may be combined with aspects of another embodiment to realize yet other embodiments. Further, each independent feature, component, or step of any given system or method may constitute an additional embodiment.

What is claimed is:

1. A system to prevent or limit resonance in a rotocraft, the system comprising:
    an airframe;
    a rotor system having a natural frequency and including a rotor and a mast attached to the airframe, the rotor system and the airframe operable to move relative to each other as the rotor system begins to oscillate; and a non-linear spring positioned between the rotor system and the airframe, the non-linear spring configured to be deformed when the rotor system and the airframe move relative to each other such that the deformation of the non-linear spring causes the natural frequency of the rotor system to change.

2. The system according to claim 1, wherein the non-linear spring is an elastomeric element.

3. The system according to claim 1, wherein the non-linear spring is a Belleville washer stack up.

4. The system according to claim 1, wherein the non-linear spring has a rounded shape.

5. The system according to claim 1, further comprising a mast actuation cylinder preventing a resonance oscillation of the mast in a fore/aft direction.

6. A system to prevent or limit resonance in a rotocraft, the system comprising:
   an airframe including an attachment fitting with a slot formed therein and having a longitudinal axis;
   a rotor system having a natural frequency and including a rotor and a mast, the rotor system and the airframe operable to move relative to each other as the rotor system begins to oscillate; and
   an attachment mechanism connecting the airframe and the rotor system, being operable to prevent or limit resonance in the rotorcraft, and including a shuttle having a first end and a second, opposing end connected to the mast with the shuttle being received in the slot of the attachment fitting such that the shuttle is operable to move generally along the longitudinal axis of the slot.

7. The system according to claim 6, further comprising an endcap located adjacent to the second end of the shuttle and attached to the attachment fitting and a non-linear spring positioned adjacent to the shuttle and operable to deform as the shuttle and the mast move relative to the attachment fitting of the airframe.

8. The system according to claim 7, further comprising at least two shuttles and at least two endcaps.

9. The system according to claim 6, wherein the slot is partially defined by a ledge such that the ledge and the first end of the shuttle form a first aperture when the ledge and the first end of the shuttle are positioned adjacent each other, the system further comprising an endcap of the attachment mechanism located adjacent to the second end of the shuttle and attached to the attachment fitting such that the end cap and the second end of the shuttle form a second aperture, a first non-linear spring positioned in the first aperture, and a second non-linear spring positioned in the second aperture with the first and second non-linear springs operable to deform as the shuttle and the mast move relative to the attachment fitting of the airframe.

10. The system according to claim 6, wherein the attachment fitting carries substantially all of the weight of the airframe when the rotor is providing substantially all of the lift of the rotorcraft.

11. A method for preventing or limiting resonance in a rotorcraft, the method comprising:
   providing a rotorcraft including an airframe, a rotor system having a natural frequency and a rotor and a mast, and an
   attachment mechanism positioned between the airframe and the rotor system, the rotor system and the airframe operable to move relative to each other as the rotor system begins to oscillate;
   causing the rotor system and the airframe to move relative to each other; and
   activating the attachment mechanism to change the natural frequency of the rotor system.

12. The method according to claim 11, wherein the attachment mechanism is a non-linear spring configured to be deformed when the rotor system and the airframe move relative to each other such that the deformation of the non-linear spring causes the natural frequency of the rotor system to change.

13. The method according to claim 12, wherein the non-linear spring is an elastomeric element.

14. The method according to claim 12, wherein the non-linear spring is a Belleview washer stack up.

15. The method according to claim 12, wherein the non-linear spring has a rounded shape.

16. The method according to claim 12, wherein the rotorcraft that is provided further includes a mast actuation cylinder preventing a resonance oscillation of the mast in a fore/aft direction.

17. The method according to claim 11, wherein the airframe includes an attachment fitting with a slot formed therein and having a longitudinal axis and the attachment mechanism includes a shuttle having a first end and a second, opposing end connected to the mast with the shuttle being received in the slot of the attachment fitting such that the shuttle is operable to move generally along the longitudinal axis of the slot.

18. The method according to claim 17, wherein an endcap is located adjacent to the second end of the shuttle and attached to the attachment fitting and the attachment mechanism is a non-linear spring positioned adjacent to the shuttle and operable to deform as the shuttle and the mast move relative to the attachment fitting of the airframe.

19. The method according to claim 17, wherein the slot is partially defined by a ledge such that the ledge and the first end of the shuttle form a first aperture when the ledge and the first end of the shuttle are positioned adjacent each other, and the attachment mechanism includes an endcap located adjacent to the second end of the shuttle and attached to the attachment fitting such that the end cap and the second end of the shuttle form a second aperture, a first non-linear spring positioned in the first aperture, and a second non-linear spring positioned in the second aperture with the first and second non-linear springs operable to deform as the shuttle and the mast move relative to the attachment fitting of the airframe.

20. The method according to claim 11, wherein the step of causing the rotor system and the airframe to move relative to each other includes introducing oscillation into the mast.

\* \* \* \* \*